Patented Oct. 9, 1923.

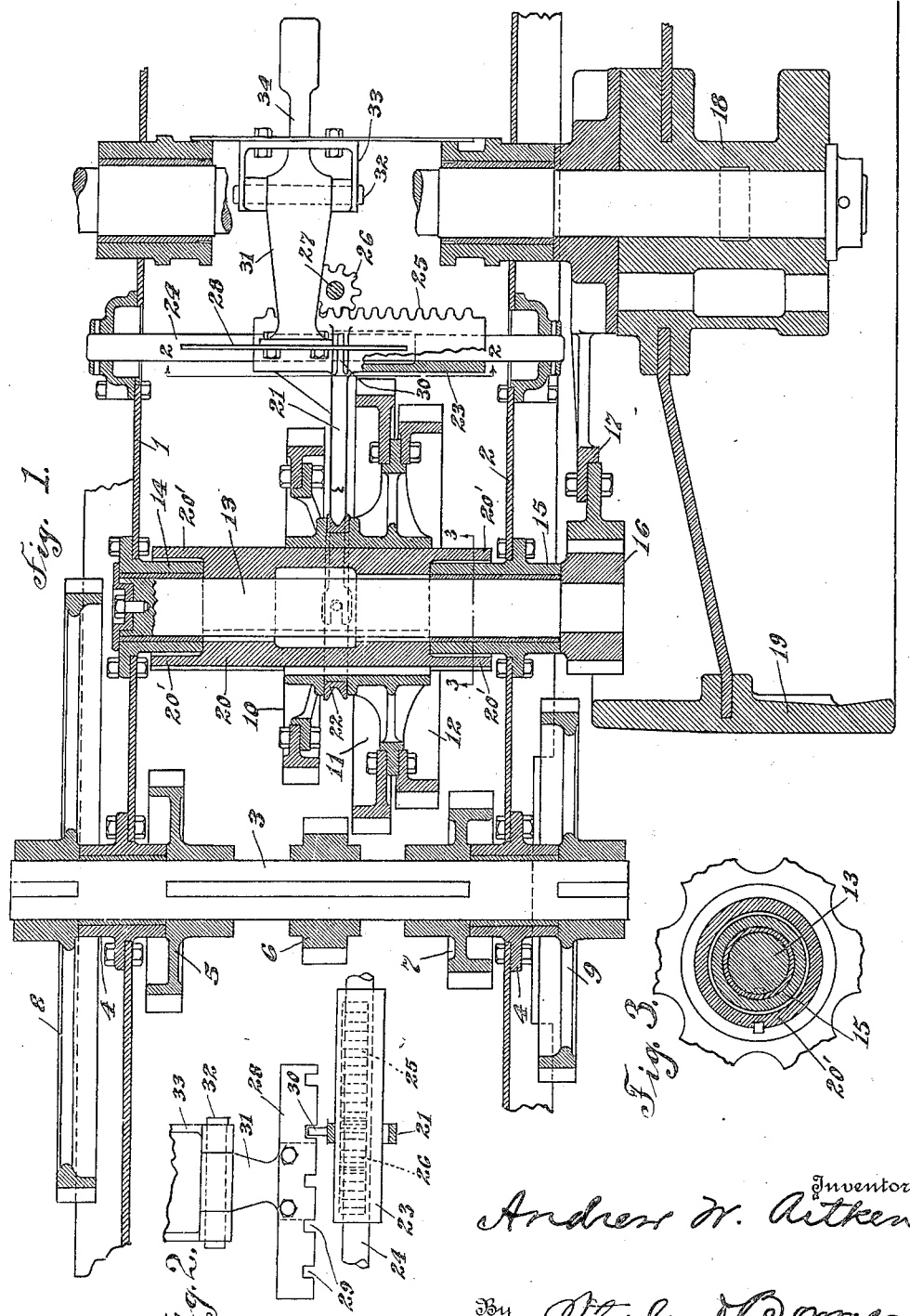

1,470,315

UNITED STATES PATENT OFFICE.

ANDREW W. AITKEN, OF SPRINGFIELD, OHIO, ASSIGNOR TO THE BUFFALO-SPRINGFIELD ROLLER COMPANY, OF SPRINGFIELD, OHIO, A CORPORATION OF OHIO.

ROAD ROLLER.

Application filed July 3, 1922. Serial No. 572,401.

*To all whom it may concern:*

Be it known that I, ANDREW W. AITKEN, a citizen of the United States, residing at Springfield, in the county of Clark and State of Ohio, have invented certain new and useful Improvements in Road Rollers, of which the following is a specification.

My invention relates to improvements in road rollers, it particularly relating to the change of speed devices for such machines.

In the construction of road rollers it is essential that the rollers be constructed within narrow limits in order that the rear rollers shall be located close enough together to form a proper crest on narrow roads. This arrangement necessarily limits the distance between the side frame members of the machine with a consequent limited space to accommodate certain of the working parts such as the change of speed gears. It has been common practice to locate the shiftable gears of the change of speed mechanism upon a counter-shaft which is supported by the side frame members, and due to the heavy construction of the parts it has been necessary to extend the bearings for this shaft a considerable distance on the inside of the side frame members. Because of these conditions it has been found impossible to accommodate more than two shiftable change of speed gearing upon this counter-shaft because of the fact that the gears were located directly upon the shaft between the bearings. It is desirable, however, in machines of this kind to have more than two changes of speed, three being a desirable number.

The object of this invention is to devise a novel arrangement whereby sufficient bearing space is provided between the frame members to accommodate at least one additional shiftable gear whereby three changes of speed may be secured.

A further object of the invention is to provide improved means for locking the shifting devices for the shiftable gears of the change of speed transmission.

In the accompanying drawings:

Fig. 1 is a transverse section of so much of a road roller as is necessary to illustrate the improvements.

Fig. 2 is a section on the line 2—2 of Fig. 1.

Fig. 3 is a section on the line 3—3 of Fig. 1.

Referring to the drawings, 1 and 2 represent the side frame members shown as constructed of steel plates. A shaft 3 is mounted in bearings 4 in the side frame members and contains three gears 5, 6 and 7. This shaft also has at the respective ends thereof gears 8 and 9 by which motion may be imparted to the shaft in either direction from any well known power mechanism. The gears 5, 6 and 7 form part of the change of speed mechanism and are the driving gears of that mechanism. The shiftable gears are indicated at 10, 11 and 12 and are located upon the counter-shaft 13 carried by the bearings 14 and 15 secured to the side frame members which bearings it will be noticed extend for a considerable distance on the inside of the frame members. The counter-shaft has a pinion 16 meshing with a gear 17 which is secured in any suitable manner to the hub 18 of one of the ground wheels, the rim of which is represented by 19. The shiftable gears 10, 11 and 12, in the present case, however, instead of being mounted directly upon the counter-shaft 13 are keyed to a cylindrical sleeve member 20 which in turn is keyed to the counter-shaft 13 so as to be rotatable therewith. This sleeve member has each of its ends formed with an enlarged bore to accommodate the bearings 14 and 15, as indicated at 20', the ends of the sleeve extending to points in comparatively close proximity to the side frame members, so that the gears may be shifted to points extending substantially the full width of the distance between the said frame members instead of the distance between the ends of the bearings 14 and 15, as would be the case if the gears were mounted directly upon the counter-shaft in the usual way. This arrangement it will be readily seen enables me to nicely accommodate at least three shiftable gears and at the same time restrict the distance between the frame members to the necessary limit explained.

For the purpose of shifting the gears 10, 11 and 12, which are all connected together so as to be simultaneously moved, there is provided a yoke of usual form indicated at 21 which straddles the collar 22. The yoke is connected to a sleeve 23 which is slidably mounted upon the guide rod 24, the sleeve having a rack 25 meshing with a pinion 26 on a substantially vertical shaft 27 which is provided with a hand wheel (not shown)

by means of which the shifting may be accomplished. In order to lock the gears in shifted position there is provided a plate 28 formed with a series of notches 29 which cooperate with a web 30 projecting from the sleeve 23 (see Fig. 2). The plate is carried by one end of a lever 31 pivoted on a pin 32 carried by a bracket 33, the other end of the lever having a foot pedal 34. By depressing the foot pedal the plate 28 is elevated to disengage same from the projection 30 whereupon the gears may be readily shifted to desired position, and again locked in that position by releasing the lever 31.

Having thus described my invention, I claim:

1. In a machine of the character described, side frame members, bearings carried by said frame members, said bearings being extended inwardly beyond the inside faces of said frame members, a shaft mounted in said bearings, said shaft being provided with a cylindrical mounting for shiftable gears, which form a part of change of speed mechanism, said mounting being projected over the said bearings, for the purpose specified.

2. In a machine of the character described, side frame members, bearings carried by said frame members, said bearing being extended inwardly beyond the inner faces of said frame members, a shaft mounted in said bearings, a sleeve connected to said shaft, said sleeve having been extended over said bearings, and a plurality of shiftable gears mounted on said sleeve and splined thereto, said gears forming part of change of speed mechanism.

3. In a machine of the character described, a plurality of shiftable gears forming part of a change of speed mechanism, a shiftable yoke for said gears, a pivoted lever, a member on said lever having a plurality of notches, and a projection on said yoke to cooperate with said notches to hold said yoke in different positions of adjustment.

4. In a machine of the character described, a plurality of shiftable gears, forming part of a change of speed mechanism, a shiftable yoke for said gears, a slidable sleeve connected with said yoke, a rack on said sleeve, a pinion meshing with said rack to slide said sleeve, a lever, a notched plate carried by said lever and a projection associated with said sleeve and yoke to cooperate with said notches.

5. In a machine of the character described, side frame members, bearings carried by said frame members, one at least of said bearings being extended inwardly beyond the inside face of its corresponding frame member, a shaft mounted in said bearings, said shaft having a cylindrical mounting for shiftable gears which form a part of change of speed mechanism, said mounting being projected over said inwardly projecting bearing.

6. In a machine of the character described, side frame members, bearings carried by said frame members, one at least of said bearings being extended inwardly beyond the inside face of its corresponding frame member, a shaft mounted in said bearings, a sleeve mounted on said shaft and rotatable therewith, said sleeve being projected over said extended bearing, and a plurality of shiftable gears mounted on and rotatably connected with said sleeve.

In testimony whereof, I have hereunto set my hand this 27th day of June, 1922.

ANDREW W. AITKEN.